United States Patent
Thomas

(10) Patent No.: US 11,562,140 B2
(45) Date of Patent: Jan. 24, 2023

(54) DYNAMICALLY CONFIGURABLE TEMPLATES TO SUPPORT VERSATILE DEPLOYMENT OF CONFIGURATIONS AT NETWORK DEVICES

(71) Applicant: HEWLETT PACKARD ENTERPRISE DEVELOPMENT LP, Houston, TX (US)

(72) Inventor: Brian Paul Thomas, Roseville, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 98 days.

(21) Appl. No.: 17/244,827

(22) Filed: Apr. 29, 2021

(65) Prior Publication Data
US 2022/0350966 A1 Nov. 3, 2022

(51) Int. Cl.
*G06F 21/32* (2013.01)
*G06F 40/253* (2020.01)
*G06F 40/226* (2020.01)
*G06F 40/186* (2020.01)

(52) U.S. Cl.
CPC .......... *G06F 40/253* (2020.01); *G06F 40/186* (2020.01); *G06F 40/226* (2020.01)

(58) Field of Classification Search
CPC ..... G06F 40/253; G06F 40/186; G06F 40/226
See application file for complete search history.

(56) References Cited

U.S. PATENT DOCUMENTS

| 10,284,418 | B2 | 5/2019 | Bhatia et al. |
| 2003/0115304 | A1* | 6/2003 | Murray ............... H04L 41/0803 709/222 |
| 2005/0071170 | A1* | 3/2005 | Comerford ............. G10L 15/04 704/E15.005 |
| 2006/0235968 | A1* | 10/2006 | Murray ............... H04L 41/0803 709/224 |

(Continued)

FOREIGN PATENT DOCUMENTS

CN 107786378 A 3/2018

OTHER PUBLICATIONS

Amazon Web Services, Inc., "Amazon CloudWatch," User Guide, Dec. 30, 2020, 631 pages.

(Continued)

*Primary Examiner* — Hassan Mrabi
(74) *Attorney, Agent, or Firm* — Sheppard Mullin Richter & Hampton LLP

(57) ABSTRACT

Systems and methods are provided for deploying a configuration at a network device. The deployment of the configuration includes, receiving an indication that a particular configuration of a computing component is to be deployed, extracting grammar data from the computing component, the grammar data including commands used to deploy the particular configuration of the computing component and restrictions corresponding to a subset of the commands, generating a template used to deploy the particular configuration, determining, from the grammar data, a variable that is currently undetermined and included in the particular configuration, obtaining the variable, incorporating the variable into the template, and deploying the particular configuration based on the template.

20 Claims, 13 Drawing Sheets

(56) References Cited

U.S. PATENT DOCUMENTS

2019/0286799 A1* 9/2019 Miyazaki ............... G06F 21/32

OTHER PUBLICATIONS

Amazon Web Services, Inc., "AWS Config Developer Guide",Dec. 30, 2020, 3383 pages.
Capoano, F., "Netjsonconfig Documentation", Release 0.9, Dec. 13, 2020, 99 pages.
Citrix Systems, Inc.,"AWS CloudWatch," Product Documentation, available online at <https://docs.citrix.com/en-us/citrix-intelligent-traffic-management/fusion-aws-cloudwatch.html>, Apr. 13, 2020, 3 pages.
Itential, "Itential Launches New API Services to Enable Organizations to Move Toward Network Infrastructure as Code", available online <https://www.itential.com/news/itential-launches-new-api-services-to-enable-organizations-to-move-toward-network-infrastructure-as-code/.>, Sep. 24, 2019, 4 pages.
Rallabandi, S. K., "LINCHPIN: A YAML Template Based Cross Cloud Resource Provisioning Tool," The University of Texas at Arlington, Dec. 2016, 93 pages.

* cited by examiner

DYNAMICALLY CONFIGURABLE TEMPLATES TO SUPPORT VERSATILE DEPLOYMENT OF CONFIGURATIONS AT NETWORK DEVICES

BACKGROUND

Configurations may be programmed into a computing component such as a device or a server to incorporate or enable particular settings, functions, and/or commands. Such functions may include, as illustrative examples, troubleshooting, logging, security, or manageability. In a particular example of a network device such as a switch, features of configurations may include, enabling of Virtual Trunking Protocol (VTP), access port configurations, trunk port configurations, Secure Shell Protocol (SSH) configurations, setting up management IP (Internet Protocol), assigning hostname, and domain name, as illustrative examples.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
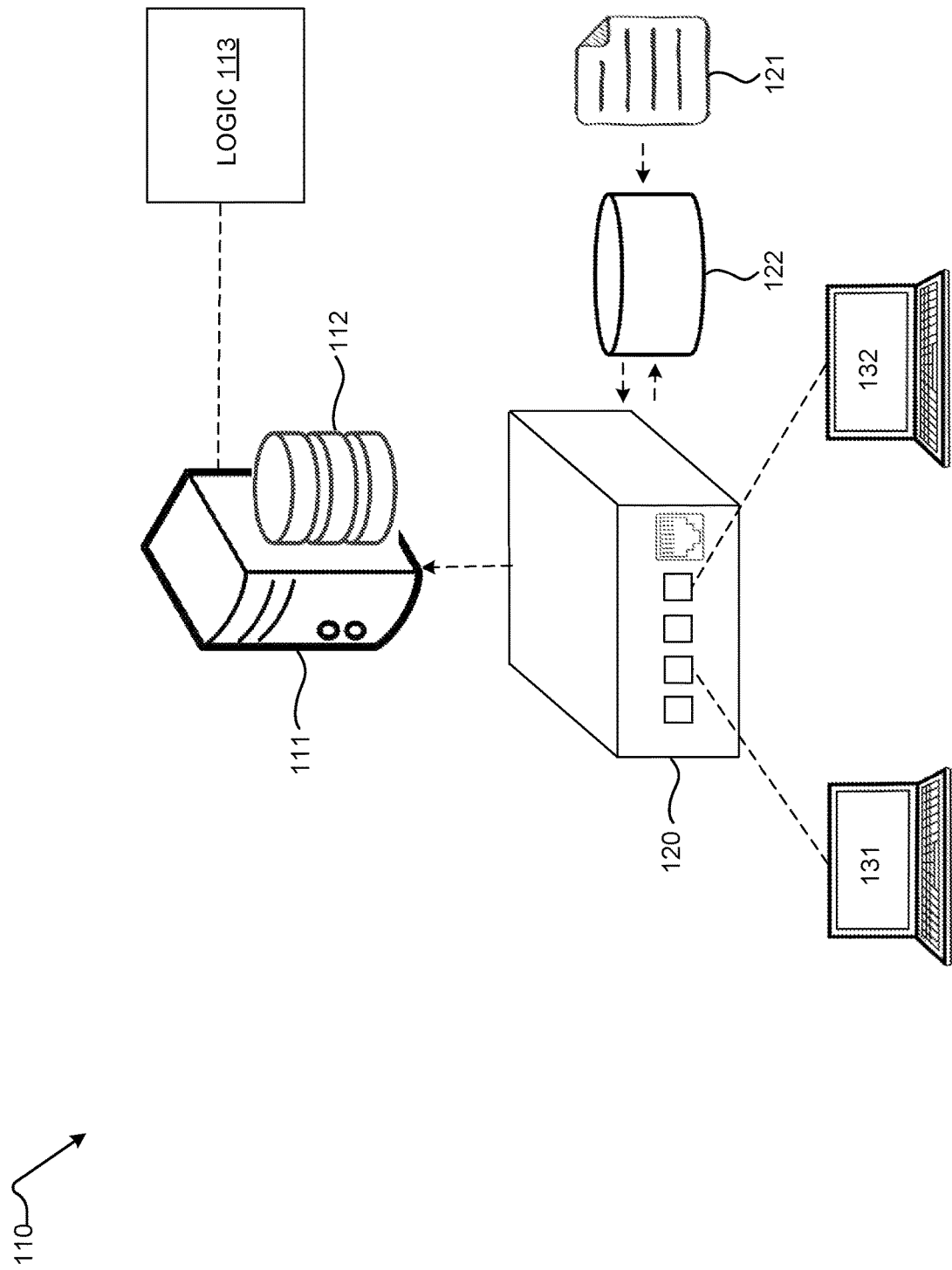
FIG. 1A is an exemplary illustration of a computing system that deploys configurations while incorporating or injecting variable data such as input data and/or current determined data of a network condition, according to embodiments described in the present disclosure.

The figures are not exhaustive and do not limit the present disclosure to the precise form disclosed.

DETAILED DESCRIPTION

One common approach of uploading configurations of a switch, a router, or other network device, involves using template files. On network devices such as switches or routers, template files may be used to implement a wide range of network configurations. Template files may be generated from snippets or portions (hereinafter "portions") of a configuration file stored on a network device. Each template file may override or redefine the portions of the stored configuration file in order to increase versatility and range of options of running different configurations. As particular illustrative examples, template files may modify an existing configuration file by increasing a range of options to suspend network access to certain client devices that are exceeding a threshold amount of data traffic, or increasing security requirements for certain client devices to obtain network access.

However, one limitation of template files is that they are largely static. In particular, generally, current template files can neither be dynamically updated by changing parameters or data in a network, nor be dynamically updated to run different configurations depending on the changing parameters or data. Such limitations may compromise the robustness and functionality of existing configurations and limit the ability to deploy more complex configurations. Additionally, the creation of template files is primarily a manual process. As a result, many current solutions that attempt to implement template files do not autogenerate existing commands or parameters of existing or previously utilized or implemented configurations. Additionally, existing solutions fail to, or are limited in capability of supporting flow and control logic, accepting input data, or incorporating live or recently determined network data. Further shortcomings of existing solutions include a lack of, or limited functionality of, creation or modification of template files during runtime. Furthermore, current solutions generally do not implement consistency checks both prior to and during deployment of a configuration. Resolving shortcomings such as the aforementioned is becoming more urgent due to a proliferation in both numbers of and functionalities of client devices seeking to connect to networks. As a result, network data and conditions change rapidly, meaning that network configurations need to adapt to such changing conditions.

The static and limited nature of many current template files used to implement configurations of network devices may be inadequate to address challenges of current and future network environments. Embodiments described herein address these challenges by implementing a computing component, such as a server, that includes logic or instructions to autogenerate existing commands and parameters of configurations from a grammar file stored at a network device. A grammar file of a network device may include commands available in a network configuration and thus encapsulate the features and/or capabilities of a network configuration. Additionally, the computing component may support flow and control logic, accept input data, and incorporate live or recently determined network data. Moreover, the computing component may include logic or instructions to create or modify template files during runtime, while implementing consistency checks both prior to and during deployment of a configuration. By addressing these challenges, the solutions described below facilitate the incorporation of current data from a network in order to improve a performance and robustness of a configuration. As one example, these solutions may support intent-based networking. For example, routing of packets may be based on delay, jitter, and packet drop rate. Current parameters or data associated with the delay, jitter, and packet drop rate may be obtained, and used to adjust configuration settings or protocols. Such configuration settings or protocols may be continuously adapted to minimize current delay, jitter, and packet drop. In such a manner, these solutions may constantly adapt to changing network conditions to optimize a network performance, rather than being stuck on a particular configuration.

FIG. 1A is an exemplary illustration of a computing system 110 that deploys configurations while incorporating or injecting variable data such as input data and/or current determined data of a network condition. In FIG. 1A, the computing system 110 may include a computing component 111 that includes one or more hardware processors that carry out functions to control or coordinate operations at one or more devices, such as a network device 120. The computing component 111 may include a server, such as a remote server disposed separately from the network devices. In some embodiments, the operations may include, for example, deploying or modifying configurations. Although the foregoing description primarily refers to a switch, the foregoing description may also be applicable to other network devices such as a router. Additionally, such embodiments described below may be applicable not only to a network (e.g., switch or router configuration), but also to any other components, such as a server or other device, that utilize a configuration file. The computing component 111 may include logic 113 that includes instructions to carry out the functions of the computing component 111, which may include extracting grammar data 121 from the network device 120 and generating a schema, from the grammar data 121, that includes input data used to modify an existing configuration or create a new configuration. The grammar data 121 may be manifested as a grammar file, which may be stored or encapsulated within a network device. The grammar data 121 may include settings, functionalities, protocols, definitions, and/or commands supported by the network device 120. Within the commands or definitions, the grammar data 121 may further indicate or identify portions that are static (e.g., not requiring additional inputs or data) and other portions that require additional inputs or data, such as, information to be entered by a user of particular client devices that have priority to higher network speeds in an event of congestion, in a particular configuration. The grammar data 121 may be used to generate a schema, such as a JavaScript Object Notation (JSON) Schema, which includes similar information as the grammar data 121 but presents the grammar data 121 in a reorganized format to be more conducive in validating new configurations before being deployed. For example, the JSON schema may include properties of different portions of commands or definitions from the grammar data and/or may annotates the different portions based on the identification. For example, the JSON schema may identify the portions that are static and the other portions that require the additional inputs or data.

As an illustrative example of a functionality of the grammar data 121, the grammar data 121 may include MAC (media access control) address filtering, which controls access to a network by client devices by permitting or denying access to certain client devices based on their detected MAC addresses. Additionally, before deploying configurations, commands inputted or otherwise incorporated in the configurations may be validated, for example, to verify proper syntax. The validation may be based on a comparison between the incorporated commands and the JSON Schema.

Figure 1B:
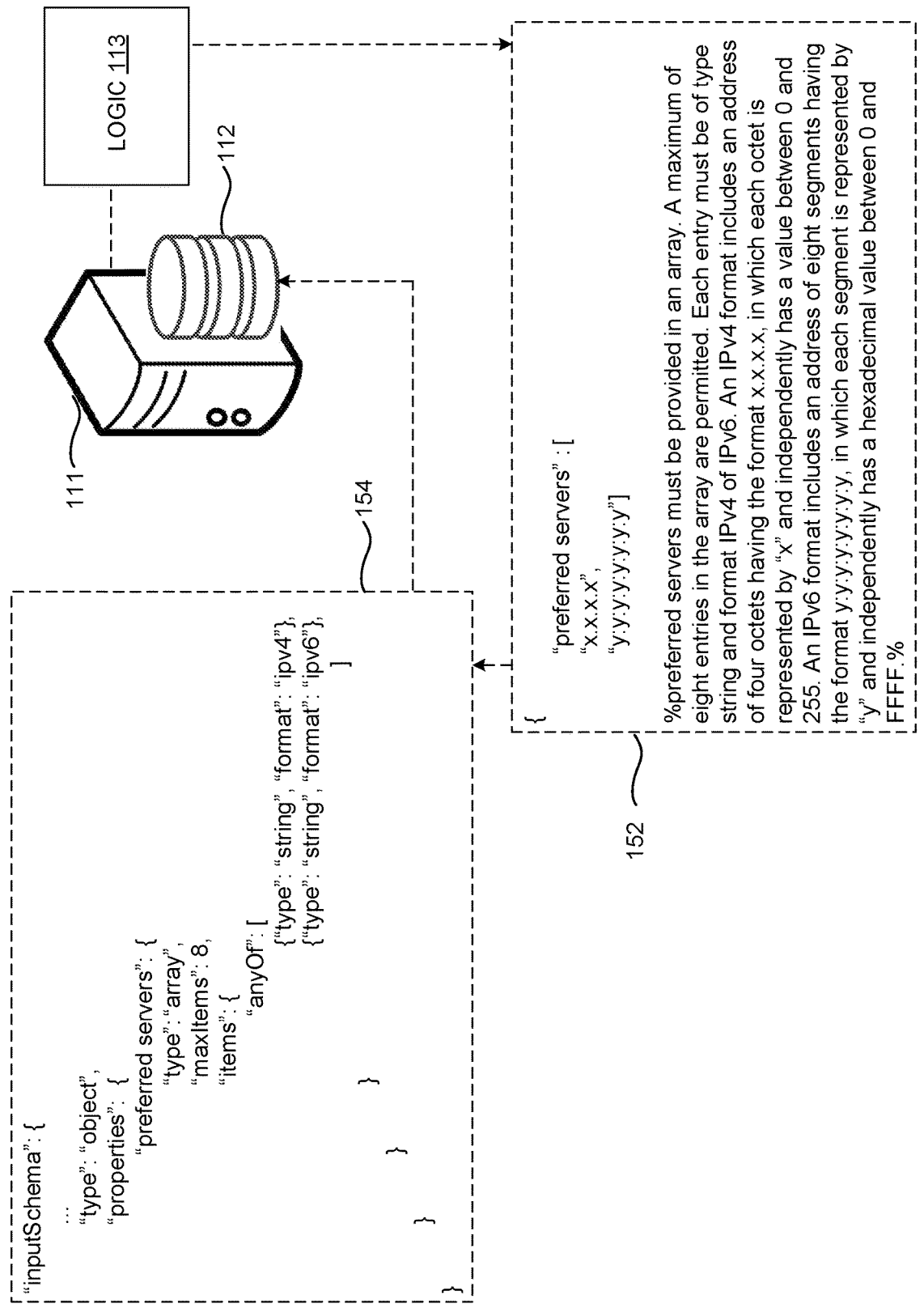
FIG. 1B is an exemplary illustration of a conversion from grammar data, which may be in JavaScript Object Notation (JSON) format, to a schema such as JSON Schema, according to embodiments described in the present disclosure.

An exemplary illustration of a conversion of a portion of the grammar data 121, as represented by a grammar file 152, to a corresponding JSON schema 154, is illustrated in FIG. 1B. The grammar file 152 may include commands or definitions supported by the network device 120, in a nonexecutable format, together with variables, such as parameters, inputs, and/or data, included within the commands or definitions. In some embodiments, the variables may be required in order to the commands or definitions to be executed as part of a particular configuration. The grammar file 152 may identify formats, requirements, or other constraints of the variables. For example, the grammar file 152 may identify that a variable "preferred servers" is part of a Network Time Protocol (NTP). The grammar file 152 may further include exemplary, recommended or required formats in which the preferred servers are to be inputted or incorporated. The JSON Schema 154 may contain same or similar information as the grammar file 152, but reorganizes requirements or constraints of the variables to appear line-by-line. For example, one line of the JSON Schema stipulates that the preferred servers are to be entered or incorporated in a format of an array. A separate line stipulates that a maximum number of entries or elements of the array is eight. By such reorganization, a configuration may be validated prior to deploying the configuration by running through the JSON Schema 154 line by line to determine whether relevant portions of the configuration satisfy each line of the JSON Schema 154. As an illustrative example, if a hypothetical input to preferred servers were "x.x.x," such an input would fail to conform to the JSON Schema because it is not in accordance with an IPv4 (e.g., "x.x.x.x") format or an IPv6 (e.g., y:y:y:y:y:y:y:y) format. Thus, the logic 113 would identify that the last four lines of the JSON Schema were not satisfied.

Referring back to FIG. 1A, the logic 113 may also include instructions to obtain updated parameters or data of a network. The logic 113 may additionally include instructions to obtain input data. The input data and/or the updated parameters may be incorporated into a template file that defines modifications to an existing configuration or that creates a new configuration. The logic 113 may further include instructions to continuously validate the inputted data, the updated parameters or the data, and other conditions or parameters of the network during running of the configuration. In the subsequent description, any reference to the network device 120 performing a function may be construed as that function being performed using the logic 113 of the computing component 111.

The computing component 111 may be integrated with a database 112. The database 112 may store information such as inputted parameters or data, and other parameters of a network. Such parameters or data may include, as illustrative examples, telemetry data such as current port configuration, Border Gateway Protocol (BGP) neighbors, Open Shortest Path First (OSPF) neighbors, High Availability (HA) status, or Virtual System Extension (VSX) settings. The database 112 may further store data or files required to run or execute configurations. The computing component 111 may access, obtain, or retrieve information from the database 112 in order to carry out the modification and deployment of configurations.

The computing component 111 may receive, from a network device 120, information of the grammar data 121 used by the network device 120. The grammar data 121 may be stored or encapsulated in a storage 122 and may include a library of settings, functionalities, protocols, and/or commands supported by the network device 120, parameters that may be inputted into the commands or otherwise used in a configuration of the network device 120, and particular rules such as syntactical rules of the commands and the parameters. The grammar data 121 may be in a format of raw data and nonexecutable text. The grammar data 121 may capture the features and/or capabilities of a network configuration, depending on a particular firmware model or version of the network device 120. As illustrative examples, the computing component 111 may extract, from the grammar data 121, supported commands or protocols such as NTP, VSX (Virtual System Extension), or RADIUS (Remote Authentication Dial In User Service), tunneling protocols that connect separate networks, and/or foo commands, which define variable parameters or settings such as hostnames and port numbers. The grammar data 121 may be in a JavaScript Object Notation (JSON) format, or a format similar to JSON. The computing component 111 may extract or obtain the grammar data 121 using an API (Application Programming Interface) such as Representational State Transfer (REST). The computing component 111 may transform the obtained grammar data 121 into a JSON Schema, an exemplary illustration of which is provided in FIG. 1B, to obtain specific parameters or data required as inputs in order to execute a particular configuration of a network. A JSON Schema may include a document or file, an exemplary portion of which is shown as the JSON Schema 154 of FIG. 1B, that indicates properties of the commands used to execute network configurations, as obtained from the grammar data 121. For example, the properties may include variables (e.g., inputs and/or data) included in a command. The JSON Schema may further define data types that the variables are to conform to. In particular, the data types may include, a string, a number, an object, an array, a boolean, and a null. The JSON Schema may further include dependencies (e.g., if a particular variable exists, then another variable must also exist), constraints (e.g., a range of values or objects that the variables are to conform to), enumerated values or objects (e.g., a finite selection of particular values or objects that the variables are to conform to), and encoding used to store the variables (e.g., base64 for binary data including multimedia data, but 7 bit, 8 bit, quoted-printable, and binary are other encoding options). Additional details regarding this aforementioned mechanism will be described below in relation to the subsequent FIGS., in particular, in FIG. 2A.

The storage 122 may be either internal to the network device 120 or external to the network device 120, as shown in FIG. 1A. The network device 120 may be connected to client devices such as client devices 131 and 132, which are currently accessing a network, or awaiting confirmation or authentication to access the network through the network device 120. Although only two client devices are shown, any suitable number and/or type of client devices may be connected to the network device 120.

Figure 2A:
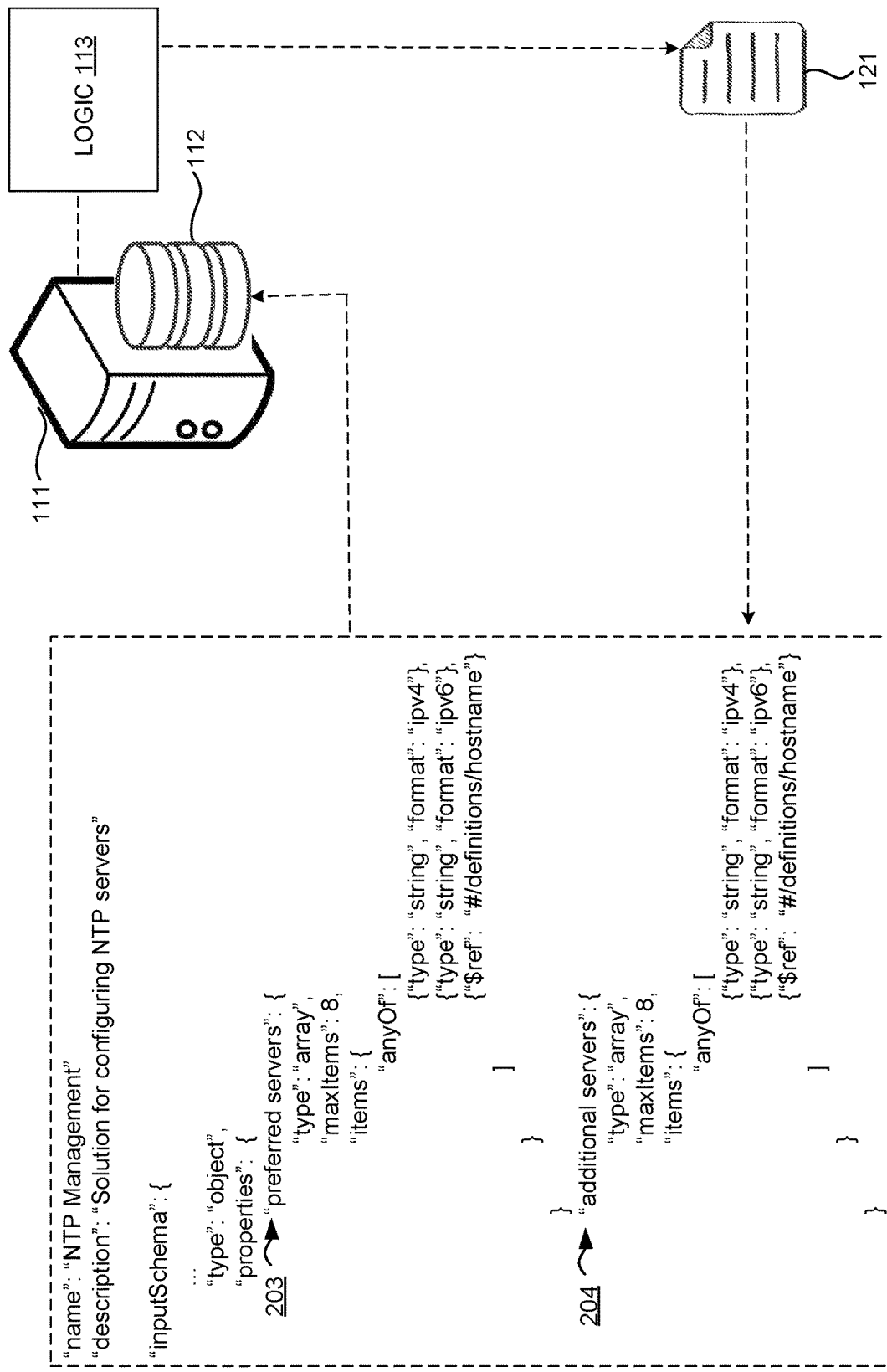
FIG. 2A is an exemplary illustration of a JSON schema obtained from grammar data of a device, according to embodiments described in the present disclosure.

The computing component 111 may initially receive a request or indication that a particular configuration of the network device 120 is to be deployed. The logic 113 may include instructions that extract subsets or portions of the grammar data 121 that include relevant commands that are included in that particular configuration, and restrictions of those commands. Here, any reference to a subset of an entity or element may refer to an entirety thereof or a portion thereof. As shown in FIG. 2A, the logic 113 may convert the subset of the grammar data 121, which may be in JSON format, into a JSON schema. The JSON schema may be stored, or manifested, for example, as a file 202 to be stored in the database 112. The file 202 may be part of a library of JSON schemas which may be generated from the grammar data 121. In order to generate and store the JSON schema, the logic 113 may execute transformations from the grammar data 121 to JSON schema, on each configuration command and corresponding parameters, rules, and/or restrictions. The commands may include, NTP, VSX, or radius, to illustrate a few examples. As an illustrative example, and as a further extension of the exemplary illustration shown in FIG. 1B, a JSON schema may include data of, or related to, particular commands or protocols such as NTP. The JSON schema may further define or identify parameters or inputs required for the NTP, such as, preferred servers or peers 203 and formats required for the preferred servers or peers 203, which may include, strings in a format of IPv4 or IPv6. As shown in the file 202, the JSON schema of (e.g., corresponding to) the NTP may identify that the preferred servers or peers 203 are to be inputted as arrays. The arrays may include strings in a format of IPv4 or IPv6. Alternatively, the arrays may include hostnames which identify particular routers. Additionally, the JSON schema may include a restriction that a maximum number of inputs of the preferred servers or peers 203 permitted for the NTP is eight. The JSON schema may further include an identification that additional servers 204 are required inputs for the NTP. The JSON schema may further include formats required for the additional servers 204, which may include, strings in a format of IPv4 or IPv6. As shown in the file 202, the JSON schema of the NTP may identify that the additional servers 204 are to be inputted as arrays. The arrays may include strings in a format of IPv4 or IPv6. Alternatively, the arrays may include hostnames. Additionally, the JSON schema may include a restriction that a maximum number of inputs of the additional servers 204 permitted for the NTP is eight. The file 202 may be stored in a storage associated with the computing component 111, such as the database 112, and may be retrieved by the computing component 111 for further processing and/or execution, such as, during validation of particular commands, functionalities, lines, or portions of a configuration. In such a manner as described above, the JSON schema may be automatically generated, rather than manually inputted, thus saving enormous amounts of time and resources.

Figure 2B:
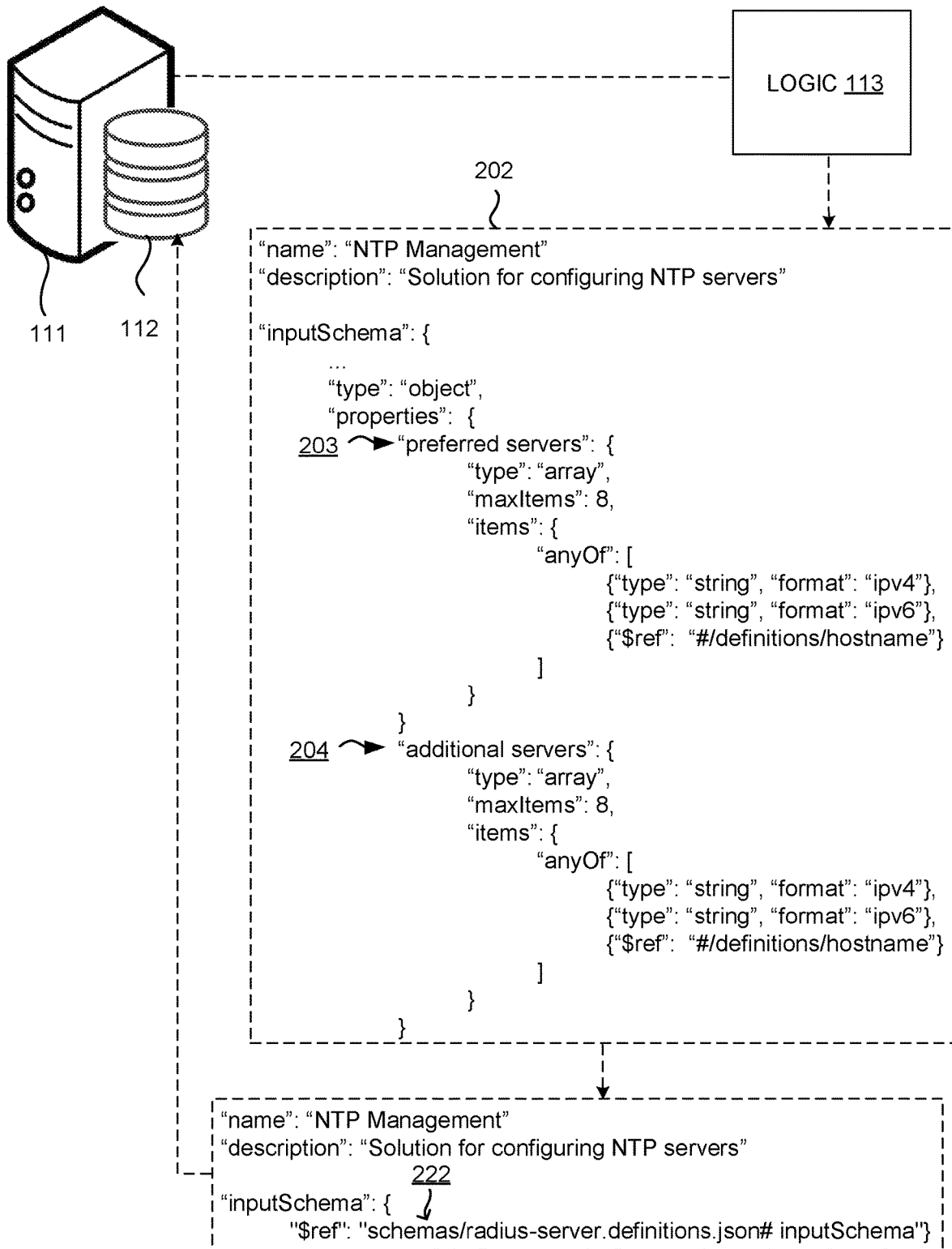
FIG. 2B is an exemplary illustration of a reference pointer to a library of JSON schemas, according to embodiments described in the present disclosure.
Figure 3:
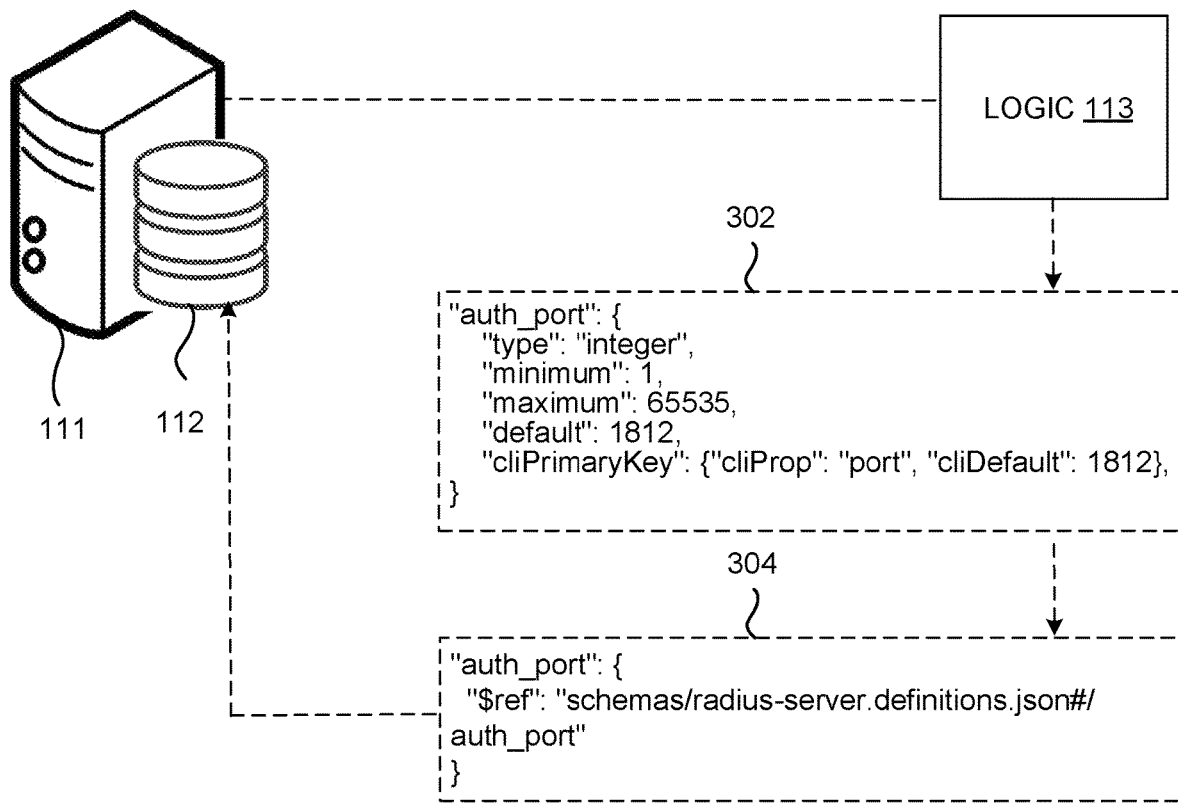
FIG. 3 is another exemplary illustration of a reference pointer to a library of JSON schemas, according to embodiments described in the present disclosure.

In some embodiments, as illustrated in FIG. 2B, the logic 113 may include instructions to replace the JSON schema definitions of an input or a parameter in the file 202 (e.g., the preferred servers or peers 203 and the additional servers 204) with a reference pointer 222 to a library of JSON schemas. Such a library may have been generated automatically from a grammar of the switch 120, as illustrated in FIG. 2A. The library may be stored, for example, in the database 112, and/or in another database such as a Remote Authentication Dial-In User Server (RADIUS) server. The library may include requirements, such as types, formats, and restrictions of the preferred servers or peers 203 and the additional servers 204. In such a manner, the file 202 may be condensed such that the file 202 need not explicitly include all data associated with the preferred servers or peers 203 and the additional servers 204, but the logic 113 may still retrieve the data from the library. Additionally, other files or resources that may utilize any data from the library may be able to reference the data without having to explicitly include all such data. Similarly, an additional example of the logic 113 replacing the JSON schema definition associated with a required input or parameter of a configuration is illustrated in FIG. 3, in which the logic 113 may replace a definition 302 associated with an authentication port with a reference pointer 304 that points to a library including such a definition.

Figure 4:
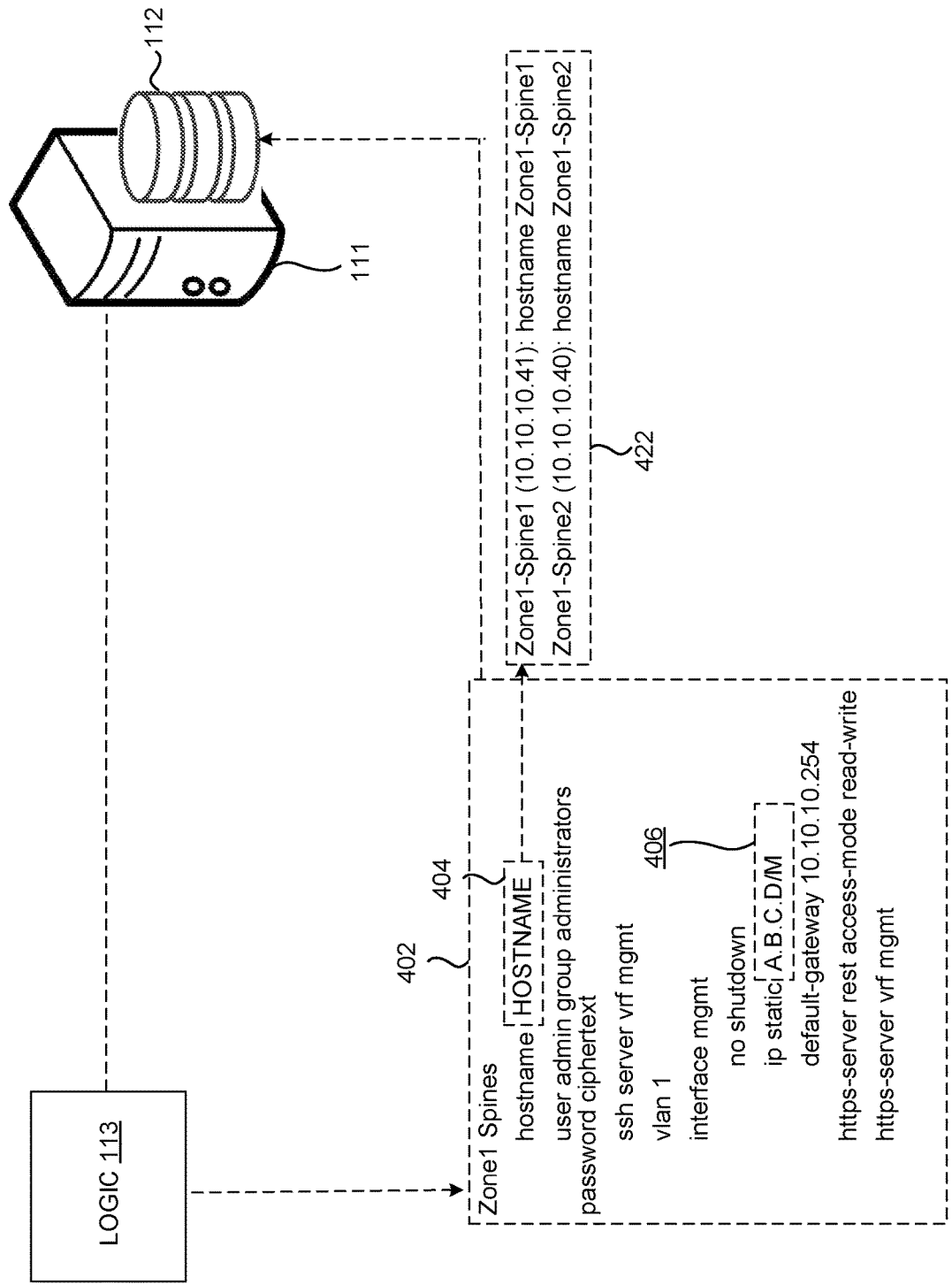
FIG. 4 is an exemplary illustration of an editing interface, in which commands to modify or replace an existing configuration of a network, or to create a new configuration, may be inputted, according to embodiments described in the present disclosure.

FIG. 4 depicts another implementation or advantage which is made possible using the grammar data 121, and includes features which may be used to generate a template from which a configuration is to be deployed, as will be described later. FIG. 4 illustrates an editing interface or screen 402 (hereinafter "editing interface"), in which commands to modify or replace an existing configuration of a network, or to create a new configuration, may be inputted, for example, in a command line interface (CLI) format. In particular, the logic 113 may include instructions to recognize commands, parameters, and parameter rules based on the grammar rules 121. In some embodiments, the logic 113 may distinguish between constant or common portions of a configuration line, and variable portions of a configuration line. The logic 113 may perform such distinguishing at least in part by using APIs. For example, in FIG. 4, the editing interface 402 may include variables 404 and 406, and the logic 113 may recognize that the variables 404 and 406 are parameters to a particular configuration of a network. As a particular example, the logic 113 may recognize that the variables 404 and 406 may be required as inputs, and may be particular to a given network or configuration. The logic 113 may further include features such as command completion, syntax checking, and recognition of differences between a current network device and other network devices, and display information regarding the aforementioned. For example, the logic 113 may include instructions to display a popup window 422 to display particular variable settings associated with the variable 404 "HOSTNAME." The popup window 422 may identify all spines listed under a given host name under a spine-leaf topology. As a further example, the logic 113 may include command completion features, for example, by inferring an intent of a particular user based on a historical frequency of commands used in previous configurations, and/or features deployed in previous configurations. Such inferring of intent may be based on machine learning algorithms. In some embodiments, the machine learning model may be trained using two sets of training data. One training dataset may include configurations or commands used or deployed at a frequency of at least a threshold frequency under a certain combination of network conditions. A second training dataset may include alternative configurations or commands that are used or deployed at a frequency of less than the threshold frequency under that combination of network conditions. For example, the second training dataset may include alternative configurations or commands that could have been deployed under that combination of network conditions, such as, those that may have been deployed by other users. Thus, the machine learning model may be able to determine and distinguish between commands or configurations that are frequently deployed and those that are infrequently deployed, but could have been deployed under particular network conditions.

Once the logic 113 infers a particular intent, the logic 113 may suggest certain commands based on the inferred intent, receive an input of whether the suggested commands are accepted or rejected by a user, and populate the commands if they are accepted by the user. If any of the suggested commands are modified by the user, the machine learning algorithm may be adjusted so that future suggestions to that user take into account the modification by the user.

Referring back to FIG. 2A, the logic 113 may include instructions to generate an interface to receive inputs as indicated by the JSON schema, or the file 202. The logic 113 may recognize which inputs or parameters in the JSON schema require input such as user input, and describe and model these inputs on the interface. For example, the logic 113 may include instructions to generate an interface to receive data of the preferred servers or peers 203, and the additional servers 204. In other embodiments, such an interface may be utilized to receive or obtain data of BGP neighbors, port configuration, or HA status.

Figure 5:
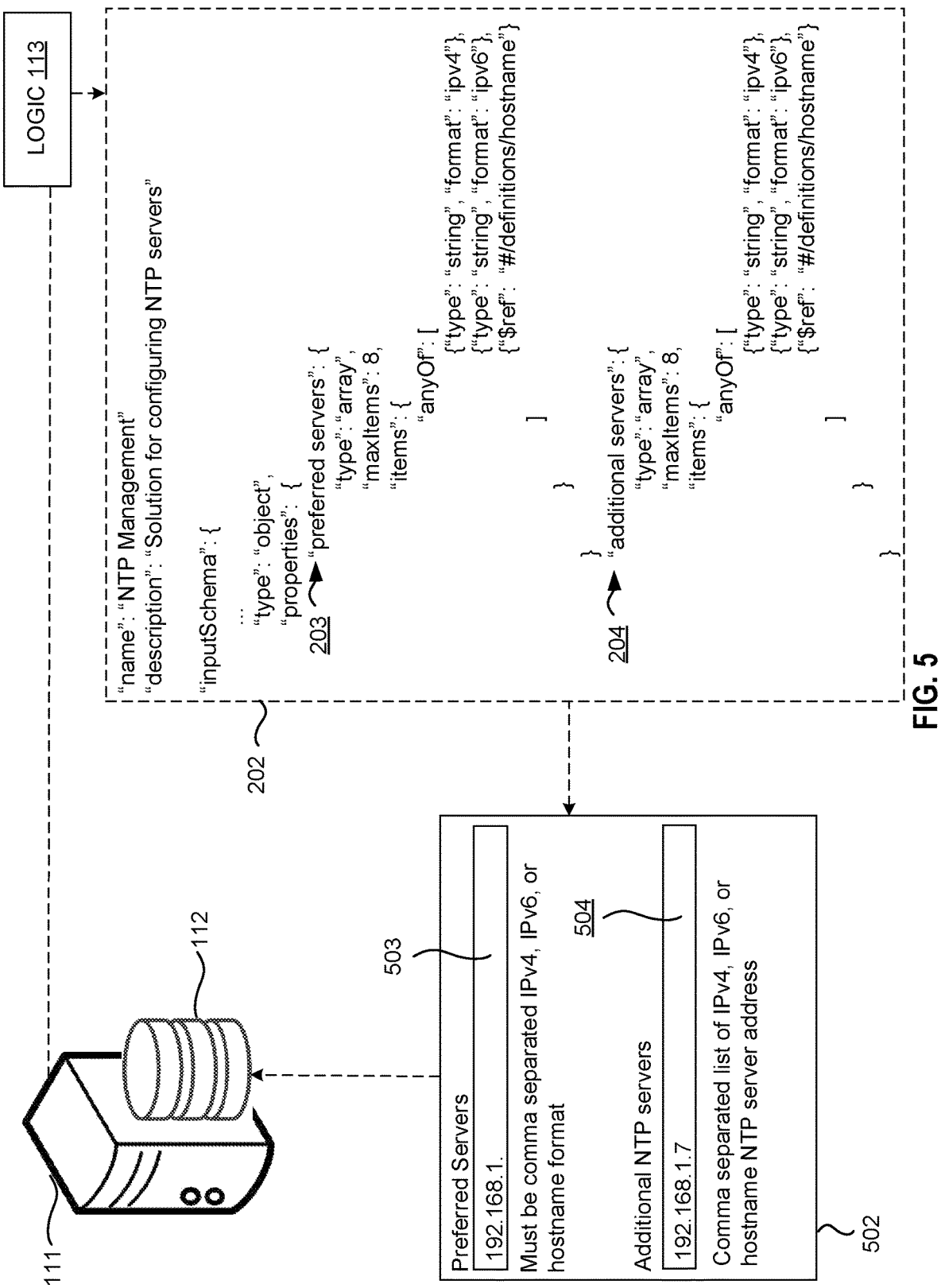
FIG. 5 is an exemplary illustration of an interface generated to request an input required to deploy a configuration, according to embodiments described in the present disclosure.

An exemplary interface is illustrated in FIG. 5. In particular, the logic 113 may generate an interface 502, which may be, for example, a user interface, that includes fields 503 and 504 to obtain data of preferred servers or peers, and additional NTP servers, respectively. The interface 502 may be generated at least in part based on the JSON schema. The logic 113 may recognize, from the JSON schema, that the preferred servers or peers 203 and the additional servers 204 are required as input data. The interface 502 may also indicate particular requirements or restrictions of inputs in the fields 503 and 504, based on the JSON schema. Such restrictions may include a type and/or format of the inputs. The logic 113 may also include instructions to validate conformance of any inputs to the restrictions. In response to the validation, the logic 113 may inject or incorporate the validated inputs into a configuration, which may be described or manifested as a template file, as will be described with respect to subsequent FIGS. The interface 502, data from the interface 502, and/or metadata from the interface 502, may be stored in a storage associated with the computing component 111, such as the database 112, and may be retrieved by the computing component 111 for further processing and/or execution. In some embodiments, if applicable, portions of or an entirety of an input may be suggested based on an intent of a user. The intent of the user may be determined or acquired by machine learning algorithms based on previous inputs from that user from other users. In some embodiments, the machine learning model may be trained using two sets of training data. One training dataset may include inputs that have historically been incorporated into the interface 502, at a frequency of at least a threshold frequency under a certain combination of network conditions (for example, particular ranges, categories, or types of parameters or data indicative of network conditions). A second training dataset may include alternative inputs that are rarely or never incorporated, for example, at a frequency of less than the threshold frequency under that combination of network conditions. For example, the second training dataset may include alternative inputs that could have been incorporated under that combination of network conditions, such as, those that may have been incorporated by other users. Thus, the machine learning model may be able to determine and distinguish between inputs that are frequently incorporated and inputs that are infrequently incorporated, but could have been incorporated under particular network conditions.

As another example, alternatively or additionally, the machine learning model may be trained using two sets of training data. A first training dataset may include recent inputs that have recently been incorporated at a frequency of at least a threshold frequency under a certain combination of network conditions. A second training dataset may include historical inputs that have been incorporated previously, but have rarely been incorporated recently, for example, at less than a threshold frequency under that combination of network conditions. Thus, the machine learning model may be trained to distinguish between inputs that have recently been incorporated and inputs that are no longer being frequently incorporated. In some embodiments, the machine learning model may determine weights of previous inputs based on how recent the inputs are. For example, the machine learning model may weigh a more recent input more heavily than a less recent input in determining or inferring an intent of a user.

Figure 6A:
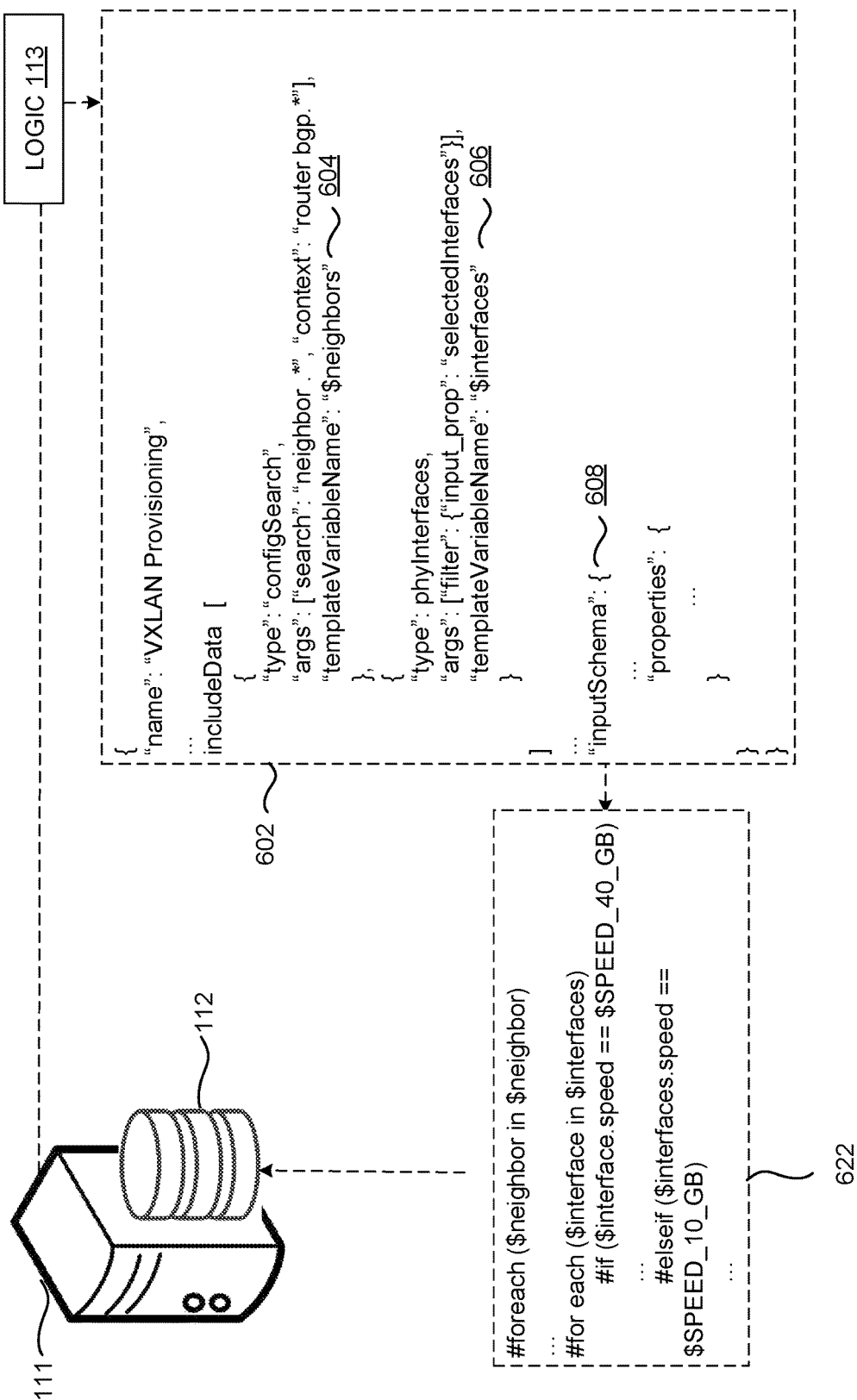
FIG. 6A is an exemplary illustration of an implementation in which current data or parameters related to a network condition are obtained outside of a JSON schema and used to deploy a configuration, according to embodiments described in the present disclosure.

The logic 113 may additionally include instructions to determine, obtain, or monitor current data or parameters in a network, which may include data of one or more particular devices in the network and/or data associated with a condition of the network. Such data or parameters may be stored or logged in a data storage such as the database 112, and may be required to execute certain configurations. Thus, the stored data or parameters may be retrieved or obtained from the database 112, and may be injected or incorporated into the JSON schema and/or the template file. As illustrated in FIG. 6A, the logic 113 may include instructions to incorporate current data or parameters and inputted data or parameters in order to configure leaf switch uplink ports to a spine and downlink ports to servers in a leaf-spine architecture. Such instructions may be embedded or otherwise incorporated in a file 602 and outside of a framework 608 of a JSON schema derived or generated from the grammar data 121. The JSON schema may be described or defined under the "inputSchema" definition in the file 602. Outside of the JSON schema, the file 602 may include commands or functionality to obtain data or parameters of a network, which may involve or call upon one or more Application Programming Interfaces (APIs) to collect or obtain different types of data or parameters. Such commands or functionality may return a type of object, which may include a JSON object, a hash map, and/or numeric and/or textual data, upon execution of the file 602. The returned object may be incorporated into a template 622 that defines or describes a configuration. Such commands or functionality may be formatted in a JSON array, in which each element includes an identifier of a particular command or instruction, an array of arguments, and a name under which the returned type of object appears when incorporated into another file such as the template 622. The arguments may be hard-coded to indicate that a particular type of data is to be passed on to another file such as the template 622, as shown in FIG. 6A, or alternatively indicate that results from an input are to be passed on to another file or interface, as will be shown in FIG. 7, in which returned objects are incorporated into a dropdown menu on a separate interface, and whichever selection is received from the dropdown menu is to be incorporated into the template 622.

Figure 6B:
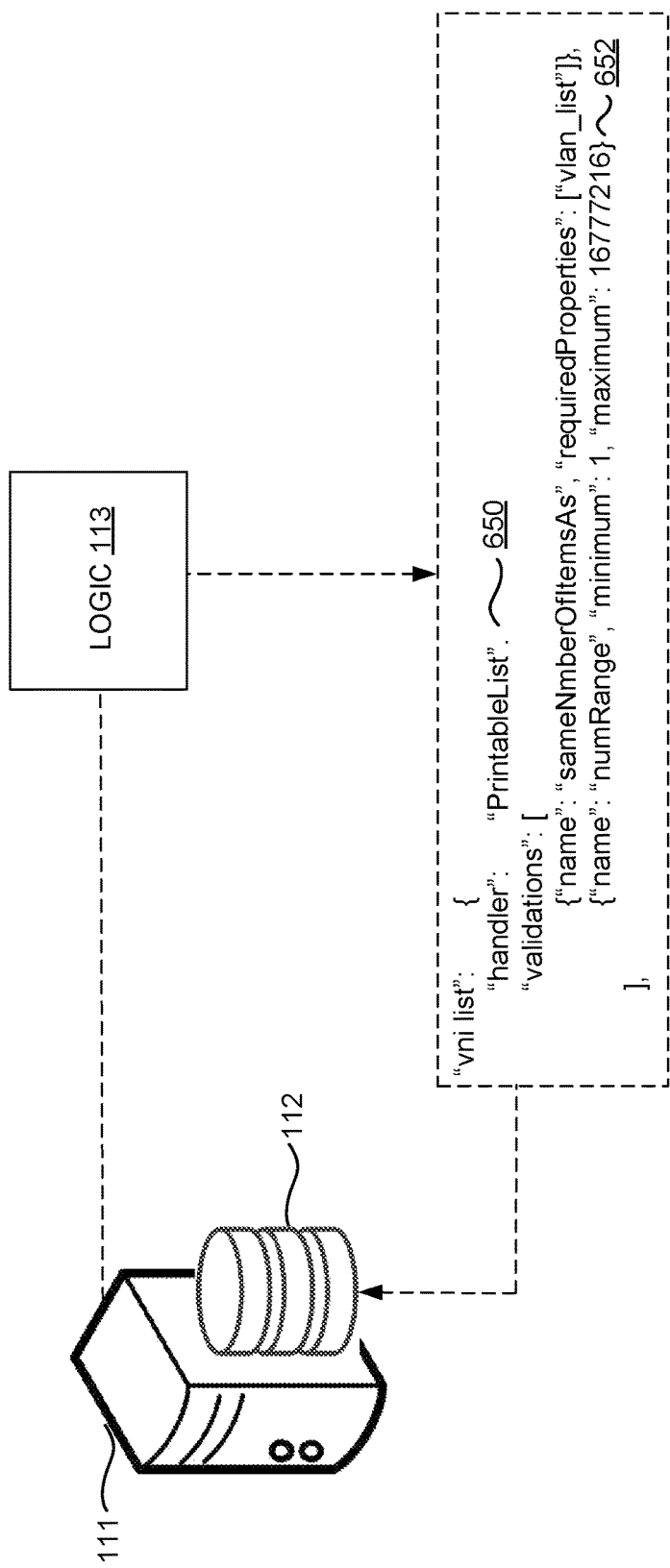
FIG. 6B is an exemplary illustration of a handler that specifies a manner in which a variable is to be rendered, according to embodiments described in the present disclosure.

As a particular example, in FIG. 6A, the template 622 may include measured current data of neighbors (e.g., BGP neighbors) that defines or describes a configuration. The measured current data of neighbors may be stored as one or more variables 604 in the database 112. In some embodiments, the logic 113 may retrieve or extract the one or more variables 604 from the database 112 to incorporate into the template 622. The logic 113 may further incorporate input data that identifies network interfaces and/or particular properties or parameters of the network interfaces, such as a speed of each of the interfaces, into the configuration, as defined in the file 602. Such a mechanism may also be outside of the framework of the JSON schema. The input data of the identified and/or the particular properties or parameters of the interfaces may be stored as one or more variables 606 in the database 112. In some embodiments, the logic 113 may retrieve or extract the one or more variables 606 from the database 112 to incorporate into the template 622. In some embodiments, the logic 113 may include a handler that renders variables in a particular format when incorporating such a variable into the template 622. The variables may be rendered as a list separated by commas, or an array inside brackets, to name a few examples. An example of a handler 650 that specifies how a list of Virtual Extensible Local Area Network (VxLAN) network identifiers (VNIs) are to be rendered, in conjunction with additional validations 652 not supported by the JSON schema, is shown in FIG. 6B. The handler 650 specifies that the VxLAN network identifiers are to be rendered as a list of comma separated values without surrounding brackets.

Depending on an identified network interface, or one or more particular properties or parameters of the identified network interface, such as a speed, the logic 113 may further include instructions to select, modify, roll back, or adjust a configuration or a particular setting or parameter of a configuration, as defined or described in the template 622. For example, if a speed of a network interface is 10 GB, a particular configuration may be deployed. If a speed of that network interface is 40 GB, a different configuration may be deployed. In such a manner, current data or parameters, and/or input data, may be applied or incorporated directly to the template 622, which defines or describes a configuration. Additionally, the current data or parameters may be constantly or periodically measured or determined during runtime, so that up-to-date data of the network may be obtained. Such incorporation of current data or parameters greatly improves upon existing technologies by ensuring that up-to-date data or parameters of the network are used to deploy and/or select a configuration. For example, a speed of a network interface may be different six hours ago compared to a current speed. If a configuration were deployed or selected based on past data, such as six hours ago, such a configuration would not accurately reflect current conditions of the network, and would likely be suboptimal for the network. Once the template is actually run, a configuration defined in the template may be executed or deployed. Thus, the current data or parameters, and/or input data, are in effect directly applied or incorporated into the configuration, and used to determine particular settings of the configuration or particular configurations to be executed.

In summary, the template 622 may include, along with commands or protocols used to execute or deploy a configuration, instantiated variables such as the variable 606 from inputs (e.g., user inputs), additional object variables such as the variable 604 which may include current measured or determined data or parameters, and conditional and/or flow-control logic that involves the instantiated variables and/or the additional object variables. The instantiated variables and/or the additional object variables may include numerals, features, or properties of the network. The conditional and/or flow control logic may implement or execute different settings of a configuration, or different configurations, depending on the instantiated variables and/or the additional object variables. As another example, the conditional and/or flow control logic may implement or execute different settings of a configuration, or different configurations, depending on a number of neighbors, and/or particular parameters or settings of any or all of the neighbors.

Figure 7:
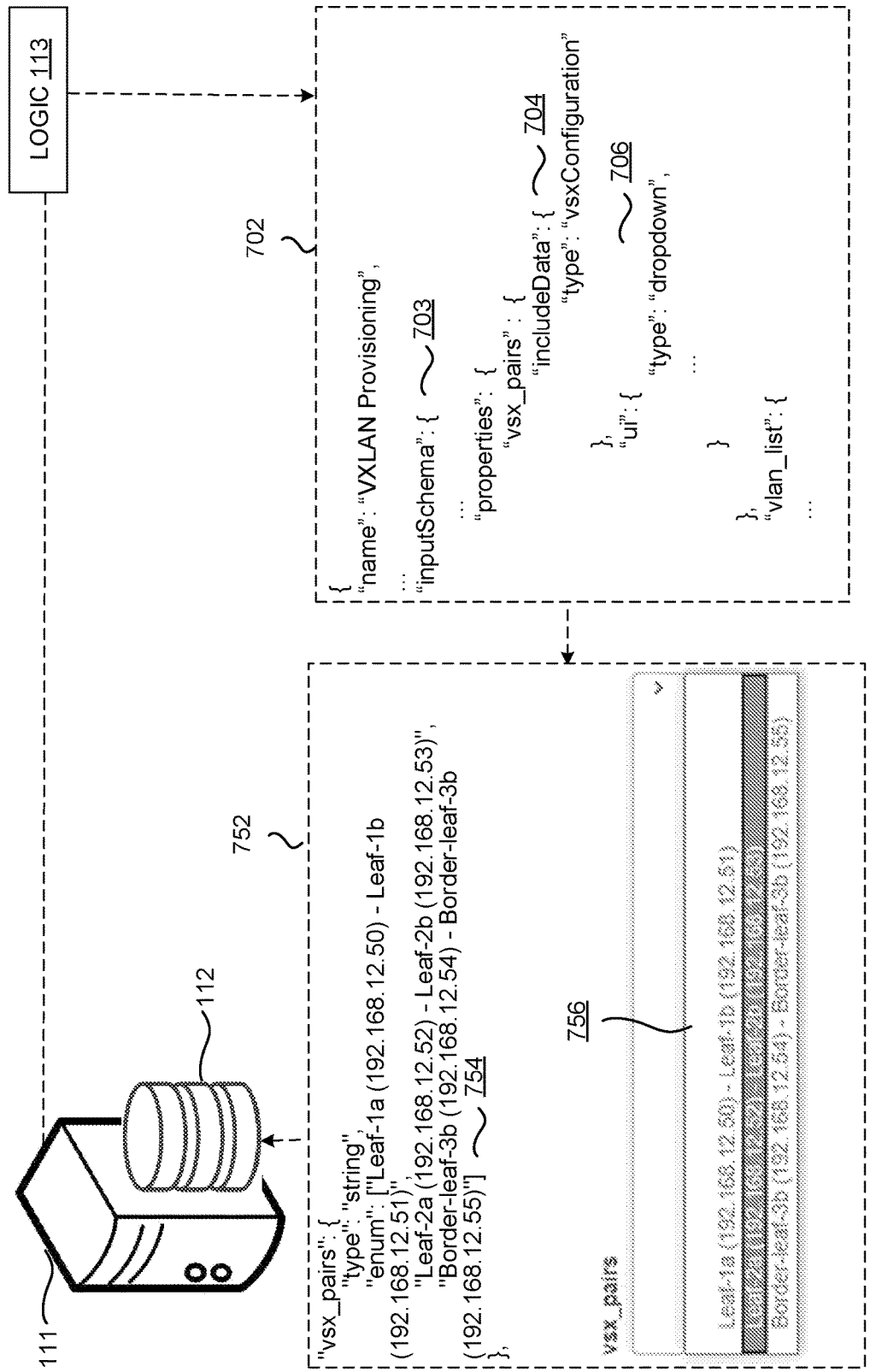
FIG. 7 is an exemplary illustration of an implementation in which current data or parameters are obtained within a JSON schema, and an interface is generated to request an input from the current data or parameters, according to embodiments described in the present disclosure.

Alternatively or in addition to incorporating or applying data or parameters directly to the template 622, as illustrated in FIG. 6A, the data and/or parameters may be applied to the JSON schema, prior to generation of a template, as illustrated in FIG. 7. In particular, the logic 113 may include instructions to generate a file 702. The file 702 may include a JSON schema 703 which may be extracted or generated from the grammar data 121, in a same or similar manner, for example, as in FIG. 2A. The file 702 may further include commands or functionality to obtain data or parameters of a network, which may involve or call upon one or more Application Programming Interfaces (APIs) to collect or obtain different types of data or parameters. Such commands or functionality may return a type of object. Such commands or functionality may be added to the JSON schema 703, as shown in an "includeData" command 704, in contrast to FIG. 6A, in which the commands or functionality are outside of the JSON schema (e.g., outside of the "inputSchema" definition). The "includeData" command 704 may include a data collection specifier, and may include a placeholder. Upon execution or running of the file 702, the "includeData" command may trigger collection of specified data, such as, data relating to a VSX configuration, such as VSX pairs. The logic 113 may generate a result 752 from running the file 702, which may include the specified data 754 that has been collected, including, for example, the VSX pairs, a type of the VSX pairs, and particular VSX pairs detected. Additionally, the file 702 may include, within the JSON schema 703, an functionality or command 706 to generate an interface, such as a UI. The functionality or command 706 may include labels, suggestions, and error text for each input field in an input form. For example, if a user enters an input in an input form that fails to conform to restrictions or rules of an entry, the suggestions may include suggested text in order to make the input conform. Meanwhile, the error text may identify a particular error, such as an entry being outside required boundaries. Referring back to FIG. 5, a particular example of error text "Must be comma separated IPv4, IPv6, or hostname format" is shown under the field 503.

Upon executing of such command or functionality, the logic 113 may generate a dropdown UI 756 including the VSX pairs detected. The logic 113 may then obtain an input that includes a selection of one of the VSX pairs in the dropdown UI 756, generate a template file, and execute or deploy a configuration based on the selection. Therefore, current network data and/or parameters may also be incorporated into the JSON schema itself, prior to generating a template file to execute or deploy a configuration. As a result of the mechanisms illustrated in FIG. 6A and FIG. 7, in which current data of a network may be incorporated into a configuration, a cornucopia of additional possibilities of complex configurations, such as those that require runtime data including BGP neighbors and port speeds, are opened up. Existing features of network configurations may further be augmented, such as, configurations between particular network devices such as between spine, leaf, and core switches.

Figure 8:
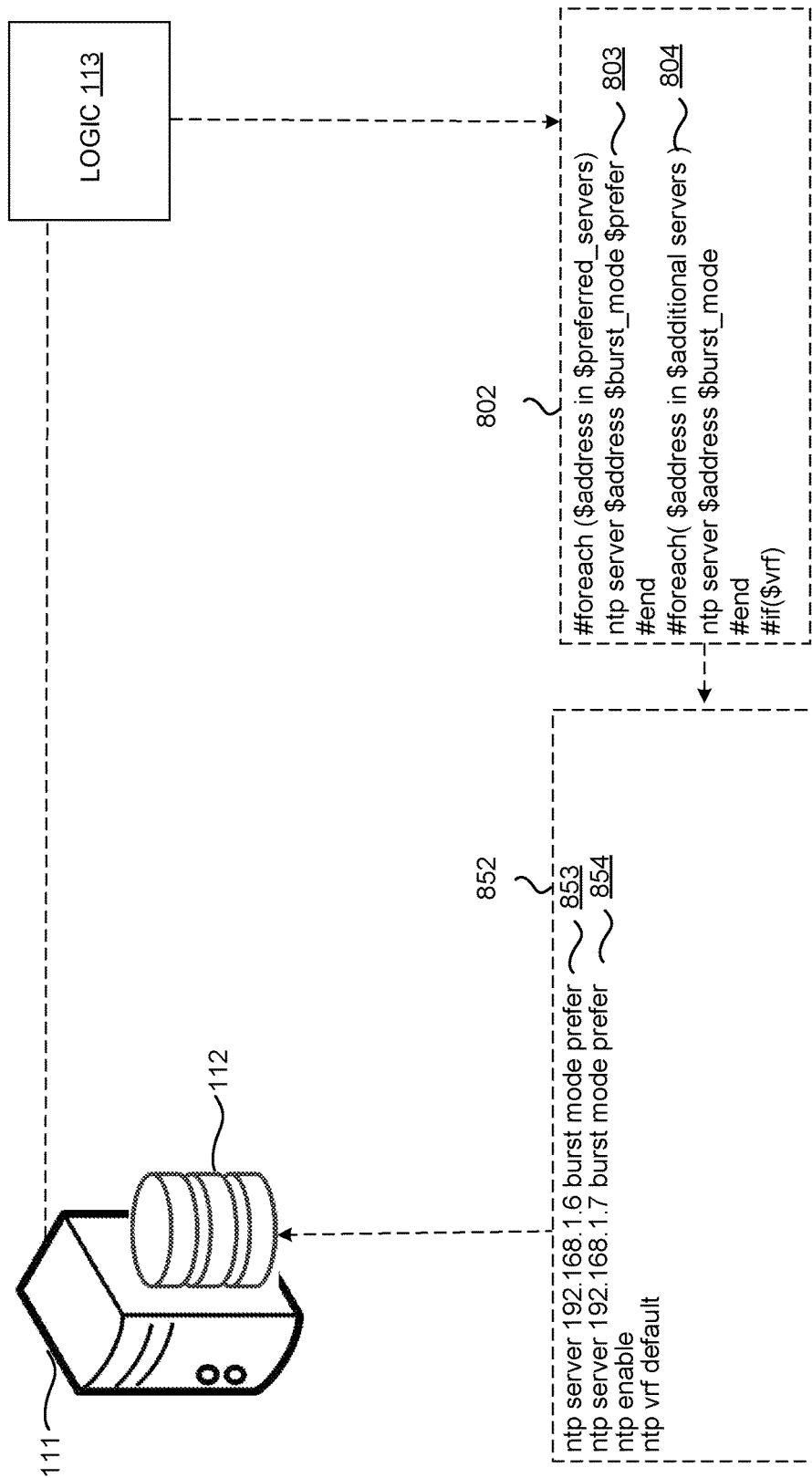
FIG. 8 is an template from which a configuration is to be deployed, according to embodiments described in the present disclosure.

A further exemplary implementation of a template used to deploy or execute a particular configuration is shown in FIG. 8. The logic 113 may generate a template 802 prior to actual deployment of a configuration of a network. Referring back to FIG. 5, the logic 113 may incorporate data or parameters of the network, such as validated input data from the fields 503 and 504, into the template 802. In particular, input data from the field 503 may be plugged in to a placeholder 803 indicating an address of a NTP preferred server and input data from the field 504 may be incorporated into a placeholder 804 indicating an address of an additional server. The logic 113 may generate a result 852, in which the placeholders 803 and 804 have been populated with the validated input data from the fields 503 and 504 in lines 853 and 854, respectively. Assume that the validated input data from the field 503 is actually 192.168.1.6. The result 852 may then be executed or deployed, following additional validations by the logic 113 and/or by a user. The result 852 may be deployed using, for example, REST APIs.

In some embodiments, templates such as the template 802 of FIG. 8 or the template 622 of FIG. 6A may be generated from recordings or captures of configuration changes, for example, from changes in an editing interface such as the editing interface 402 of FIG. 4, from snapshots of past configuration changes, or from snippets or portions of a configuration which may be provided by a user. In some examples, the logic 113 may recognize certain patterns or trends of particular features of a configuration that is typically deployed by a particular user under particular network conditions, suggest those features, and upon approval by that particular user, generate a template that includes those particular features, and/or modify an existing or current template to include those particular features. Such recognition may be based on a machine learning algorithm. In some embodiments, the machine learning model may be trained using two sets of training data. One training dataset may include features used or deployed at a frequency of at least a threshold frequency under a certain combination of network conditions. A second training dataset may include alternative features that are used or deployed at a frequency of less than the threshold frequency under that combination of network conditions. For example, the second training dataset may include alternative features that could have been deployed under that combination of network conditions, such as, those that may have been deployed by other users. Thus, the machine learning model may be able to determine and distinguish between features that are frequently deployed and those that are infrequently deployed, but could have been deployed under particular network conditions.

In a particular example of an editing interface, the logic 113 may, as alluded to in FIG. 4, distinguish between static or unchanging portions of a command or function, and variable portions from a previous recorded configuration of the editing interface 402, based on the JSON schema (e.g., the JSON schema library). The logic 113 may further map or associate lines from the previous recorded configuration to particular definitions in the JSON schema. The logic 113 may then generate a template that distinguishes between static, unchanging components and variable components or portions. For example, the logic 113 may incorporate placeholders into the template to correspond to the variable components or portions that still need to be determined or obtained. After determining the variable portions, the logic 113 may determine any data or parameters that require inputs, as shown, for example, in FIG. 5, and FIG. 7, or any data or parameters that require determination or measuring, as shown in FIG. 6A, and either initiate the creation of interfaces to request the inputs or determine or measure the data or parameters. Subsequent to obtaining the inputs and/or the data or parameters, the logic 113 may then incorporate or plug in the obtained inputs, data, and/or parameters into the variable portions, or placeholders corresponding to the variable portions. In such a manner, the logic 113 may be able to generate at least a portion of a template to deploy a configuration, simply from a previous recording of an actually deployed configuration, and replicate a previously used configuration at different times and/or under different network conditions. In addition to using previous recordings to replicate a previously used or deployed configuration, the logic 113 may also generate a template from configuration snippets, for example, provided by a user, or snapshots of past configuration changes, for example, made in the editing interface 402, in a similar manner. Such embodiments may be applicable not only to a network (e.g., switch or router configuration), but also to any other components, such as a server or other device, that utilize a configuration file.

Prior to actually deploying a configuration, and during the deployment of a configuration, as alluded to previously, the logic 113 also performs conformance checking or validation to ensure robustness of a template and a configuration. Some examples of pre-deployment validation include, determining whether requirements of VxLAN are satisfied, whether any components or networks are to communicate using VxLAN, whether all required inputs or measured data or parameters have been obtained, or whether Virtual Route Forwarding (VFR) settings exist. After satisfactorily completing such pre-deployment validation checks, the logic 113 may deploy the template and deploy the configuration. Some examples of post-deployment validation may include, determining whether VSX-Link Aggregation Groups (VSX-LAGs) are configured, and whether BGP neighbors exist. In other examples, the logic 113 may determine whether network conditions change and whether or not a current configuration should be modified as a result of the network condition changes. For example, during a deployment of a current configuration, additional devices may enter a network, and if a total number of devices exceeds a threshold, one or more parameters may no longer be in conformance with certain restrictions required to deploy the current configuration. In such an event, the logic 113 may modify the configuration based on the current network conditions.

Figure 9:
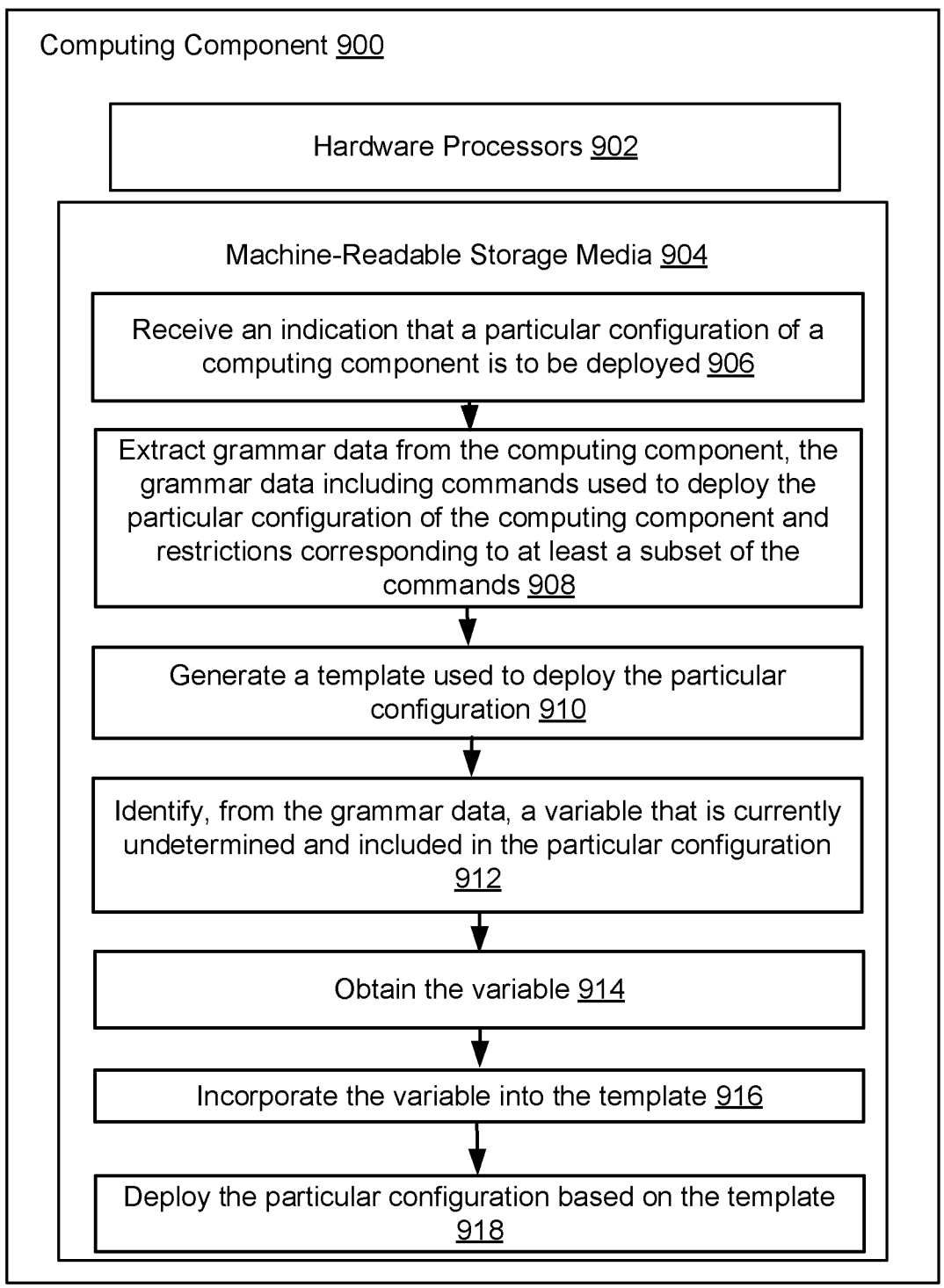
FIG. 9 is an exemplary flowchart, illustrating how a computing component such as a server deploys configurations while incorporating or injecting variable data, according to embodiments described in the present disclosure.

FIG. 9 illustrates a computing component 900 that includes one or more hardware processors 902 and machine-readable storage media 904 storing a set of machine-readable/machine-executable instructions that, when executed, cause the hardware processor(s) 902 to perform an illustrative method of generating a grammar file corresponding to grammar data of a network device. It should be appreciated that there can be additional, fewer, or alternative steps performed in similar or alternative orders, or in parallel, within the scope of the various embodiments discussed herein unless otherwise stated. The computing component 900 may be implemented as the computing component 111 of FIGS. 1A, 1B, 2A, 3A, 4A, and 5A-5B. The computing component 900 may include a server. The machine-readable storage media 904 may include suitable machine-readable storage media described in FIG. 10.

At step 906, the hardware processor(s) 902 may execute machine-readable/machine-executable instructions stored in the machine-readable storage media 904 to receive an indication that a particular configuration of a computing component is to be deployed. For example, the reception of the indication may include, receiving a selection of at least a portion of a previously deployed configuration, such as from a previously recorded deployment recorded from the editing interface 402. In other examples, the particular configuration to be deployed may include, a snippet of a configuration from a user, or a configuration change previously indicated, for example, from the editing interface 402.

Next, at step 908, the hardware processor(s) 902 may extract grammar data from the computing component. The extracted grammar data may be in a JSON format or in a format similar to JSON. The extracted grammar data may be converted into a JSON schema format. The grammar data may provide further context to deploy the particular configuration, such as, pertinent commands used to deploy the particular configuration and restrictions corresponding to a subset (e.g., meaning all or a portion) of the commands. In particular, some commands may have associated restrictions. For example, certain commands associated with a NTP protocol may require input of preferred servers or peers 203, as illustrated in FIG. 2A, and formats required for the preferred servers or peers 203, which may include, strings in a format of IPv4 or IPv6. From the JSON schema format, the hardware processor(s) 902 may distinguish static or constant portions of the commands and variable portions which require either input or determination.

Next at step 910, the hardware processor(s) 902 may generate or assemble a template used to deploy the particular configuration. This step signifies an improvement over existing methods which require a user to manually create a template. As one example, the hardware processor(s) 902 may assemble a template based on the particular configuration, which may be indicated from a previously recorded configuration, a snippet of a configuration, or an edit to an existing configuration, as described with respect to previous step 906. The hardware processor(s) 902 may populate the template to include commands required for the particular configuration, and distinguish between static components of the commands and variable components. The hardware processor(s) 902 may designate the variable components in the template as placeholders such that once the variable components have been determined, inputted, and/or validated, they would be injected into the placeholders.

Subsequently, at step 912, the hardware processor(s) 902 may determine or identify, from the grammar data, a variable that is currently undetermined and included in the particular configuration. In some embodiments, the variable may be part of one or more commands or definitions within the particular configuration. In some embodiments, the variable may be required to be determined or inputted and validated. A variable being required may be construed to mean, for example and without limitation, that without such determination or input and validation, the particular configuration may be unable to be deployed. A variable being currently undetermined may be construed as that variable not having been inputted or determined, or such that a previous determination or input of that variable is out-of-date or unreliable due to network condition changes, for example. Again, referring to the examples of FIG. 1B or FIG. 2A, the hardware processor(s) 902 may determine that a variable may include the preferred servers in FIG. 1B, or the preferred servers or peers 203 in FIG. 2A, in a command that is included in a particular configuration that runs a NTP. The preferred servers in FIG. 1B, or the preferred servers or peers 203 in FIG. 2A, may be required, such that, without a validated determination or input of the aforementioned, the hardware processors 902 are unable to deploy that particular configuration. In particular, because NTP is a networking protocol for clock synchronization, if the preferred servers were unknown, the hardware processors 902 would be unable to determine how to perform such synchronization of clock times, as the hardware processors 902 would not know which servers to use to perform the synchronization.

Next, at step 914, the hardware processor(s) 902 may obtain the variable. The obtaining of the variable may be via one or more APIs to measure or determine the variable. Alternatively, or additionally, the hardware processor(s) 902 may request an input, such as a user input, of the variable. In such a scenario, the hardware processor(s) 902 may generate an interface to request an input of the variable and receive an entry or selection through the interface. Examples of an interface are shown and described with respect to FIG. 5 and FIG. 7. For example, the hardware processor(s) 902 may generate an interface such as the interface 502 of FIG. 5 to obtain an entry. Alternatively or additionally, the hardware processor(s) 902 may generate an interface such as the interface 752 of FIG. 7 to obtain a selection from a menu such as a drop-down menu, after variables have been determined.

Next, at step 916, the hardware processor(s) 902 may incorporate or inject the variable into the template 916, at a position of, or corresponding to, the placeholder designated in step 910. The hardware processor(s) 902 may perform validation or verify a conformance of the variable prior to incorporating, injecting, or inserting the variable into the template 916.

At step 918, the hardware processor(s) 902 may deploy the particular configuration based on the template. The hardware processor(s) 902 may validate an overall conformance of network conditions prior to deploying the particular configuration, and/or receive a confirmation, such as from a user, prior to deploying the particular configuration. In some embodiments, the deployment of the particular configuration may include determining a particular setting of a configuration based on the variable that was incorporated or injected into the template. For example, referring to FIG. 6A, the hardware processor(s) 902 may determine a different setting of a configuration depending on a speed of a particular network interface, such as, whether the speed is 40 GB or 10 GB. In some embodiments, the hardware processor(s) 902 may continuously monitor whether network conditions conform to requirements or restrictions of the particular configuration even while the particular configuration is being deployed, and may adjust particular settings of that particular configuration if the network conditions fail to conform to the requirements or restrictions. As a result, the hardware processor(s) can efficiently adapt to changing network conditions without interruptions in service.

Figure 10:
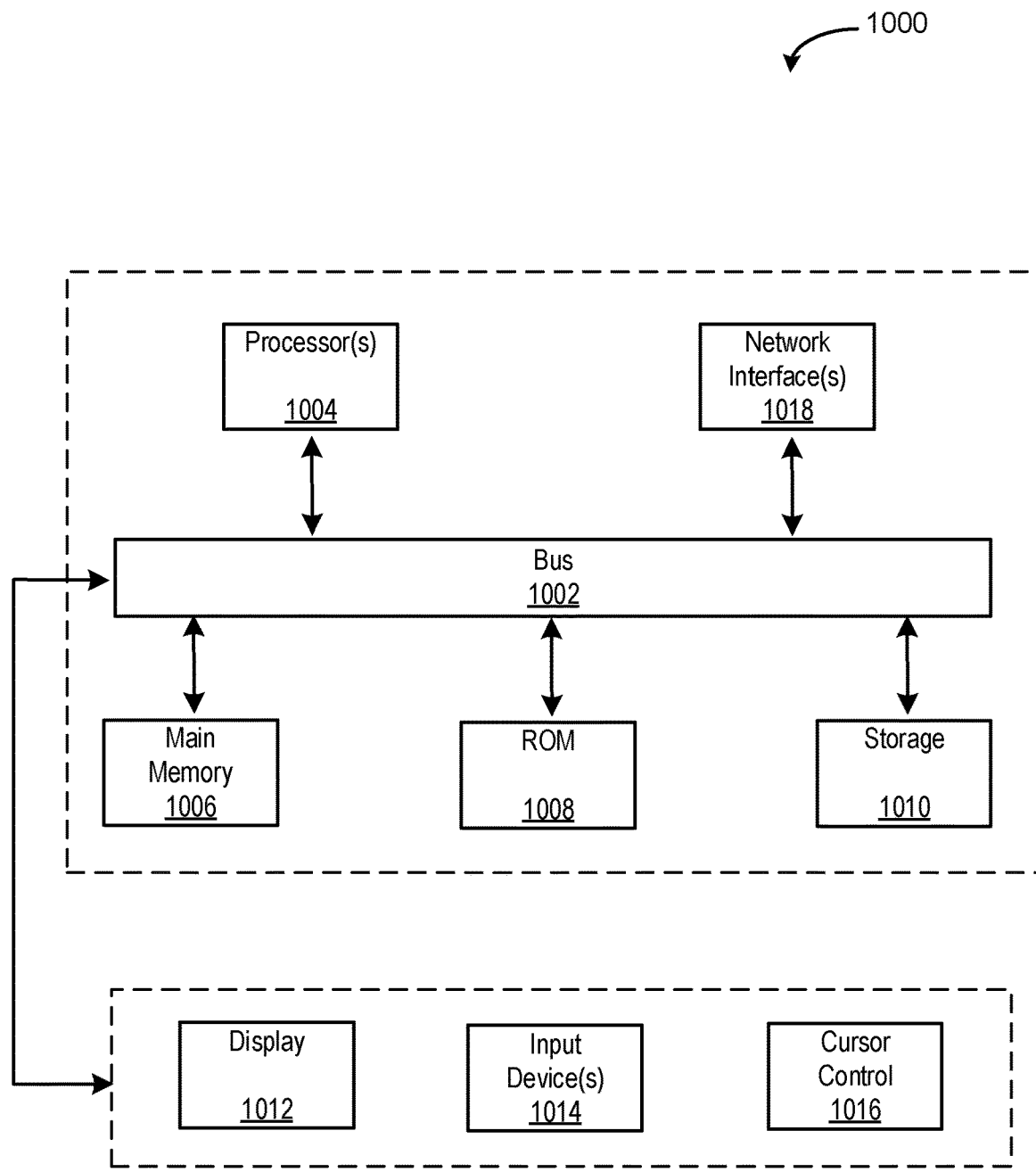
FIG. 10 is an example computing component that may be used to implement various features of embodiments described in the present disclosure.

FIG. 10 depicts a block diagram of an example computer system 1000 in which various of the embodiments described herein may be implemented. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a liquid crystal display (LCD) (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. In some embodiments, the same direction information and command selections as cursor control may be implemented via receiving touches on a touch screen without a cursor.

The computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "component," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

The computer system 1000 also includes a communication interface 1018 coupled to bus 1002. Network interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, network interface 1018 may be a local area network (LAN) card to provide a data communication connection to a compatible LAN (or WAN component to communicated with a WAN). Wireless links may also be implemented. In any such implementation, network interface 1018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network (s), network link and communication interface 1018. In the Internet example, a server might transmit a requested code for an application program through the Internet, the ISP, the local network and the communication interface 1018.

The received code may be executed by processor 1004 as it is received, and/or stored in storage device 1010, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

What is claimed is:

1. A computer-implemented method, comprising:
receiving an indication that a particular configuration of a computing component is to be deployed;
extracting grammar data from the computing component, the grammar data including commands used to deploy the particular configuration of the computing component and restrictions corresponding to a subset of the commands;
generating a template used to deploy the particular configuration;
identifying, from the grammar data, a variable that is currently undetermined and included in the particular configuration;
obtaining the variable;
incorporating the variable into the template; and
deploying the particular configuration based on the template.

2. The computer-implemented method of claim 1, wherein the generation of the template includes adding a placeholder corresponding to a position at which the variable is to be incorporated prior to the variable being determined; and the incorporation of the variable includes replacing the placeholder with the obtained variable.

3. The computer-implemented method of claim 1, wherein the variable includes any of data to be inputted or current data associated with a condition of a network.

4. The computer-implemented method of claim 3, wherein in response to the variable including data to be inputted, the method further comprises:
generating an interface to obtain the variable; and
wherein:
the obtaining of the variable includes receiving a selection through the interface.

5. The computer-implemented method of claim 1, wherein the grammar data is in a JavaScript Object Notation (JSON) format; and the method further comprises:
in response to extracting the grammar data, generating a JSON schema library that includes the commands, the JSON schema library indicating one or more static components of the particular configuration, the variable, and one or more other variables included in the particular configuration.

6. The computer-implemented method of claim 1, wherein the deploying of the particular configuration includes determining a setting of the particular configuration based on the variable.

7. The computer-implemented method of claim 1, wherein the reception of the indication includes receiving a selection of at least a portion of a previously deployed configuration.

8. The computer-implemented method of claim 1, further comprising:
prior to the deployment of the particular configuration, validating the variable to ensure conformance to any restrictions of the variable as indicated by the grammar data; and
during the deployment of the particular configuration, determining whether the variable conforms to any restrictions of the variable as indicated by the grammar data.

9. A computing system comprising:
a server that deploys a particular configuration to a network device;
one or more processors; and
a memory storing instructions that, when executed by the one or more processors, cause the one or more processors to:
receive an indication that a particular configuration of a computing component is to be deployed;
extract grammar data from the computing component, the grammar data including commands used to deploy the particular configuration of the computing component;
assemble a template used to deploy the particular configuration based at least in part on the grammar data;
identify, from the grammar data, a variable included in the particular configuration;
obtain the variable;
inject the variable into the template; and
deploy the particular configuration based on the template.

10. The computing system of claim 9, wherein the generation of the template includes adding a placeholder corresponding to a position at which the variable is to be incorporated prior to the variable being determined; and the incorporation of the variable includes replacing the placeholder with the obtained variable.

11. The computing system of claim 9, wherein the variable includes any of data to be inputted or current data associated with a condition of a network.

12. The computing system of claim 11, wherein the instructions further cause the one or more processors to:
in response to the variable including data to be inputted:
generate an interface to obtain the variable; and
the obtaining of the variable includes receiving a selection through the interface.

13. The computing system of claim 9, wherein the grammar data is in a JavaScript Object Notation (JSON) format; and the instructions further cause the one or more processors to:
in response to extracting the grammar data, generate a JSON schema library that includes the commands, the JSON schema library indicating one or more static components of the particular configuration, the variable, and one or more other variables included in the particular configuration.

14. The computing system of claim 9, wherein the deploying of the particular configuration includes determining a setting of the particular configuration based on the variable.

15. The computing system of claim 9, wherein the reception of the indication includes receiving a selection of at least a portion of a previously deployed configuration.

16. The computing system of claim 9, wherein the instructions further cause the one or more processors to:
- prior to the deployment of the particular configuration, validate the variable to ensure conformance to any restrictions of the variable as indicated by the grammar data; and
- during the deployment of the particular configuration, determine whether the variable conforms to any restrictions of the variable as indicated by the grammar data.

17. A non-transitory computer-readable storage medium including instructions that, when executed by at least one processor of a computing system, cause the computing system to perform a method comprising:
- receiving an indication that a particular configuration of a computing component is to be deployed;
- extracting grammar data from the computing component, the grammar data including commands used to deploy the particular configuration of the computing component and restrictions corresponding to a subset of the commands;
- generating a template used to deploy the particular configuration;
- identifying, from the grammar data, a variable that is currently undetermined and included in the particular configuration;
- obtaining the variable;
- incorporating the variable into the template; and
- deploying the particular configuration based on the template.

18. The non-transitory computer-readable storage medium of claim 17, wherein the generation of the template includes adding a placeholder corresponding to a position at which the variable is to be incorporated prior to the variable being determined; and the incorporation of the variable includes replacing the placeholder with the obtained variable.

19. The non-transitory computer-readable storage medium of claim 17, wherein the variable includes any of data to be inputted or current data associated with a condition of a network; and wherein:
- in response to the variable including data to be inputted, the method further comprises:
  - generating an interface to obtain the variable; and
- the obtaining of the variable includes receiving a selection through the interface.

20. The non-transitory computer-readable storage medium of claim 17, wherein the deploying of the particular configuration includes determining a setting of the particular configuration based on the variable.

* * * * *